United States Patent
Lee

(10) Patent No.: US 8,106,282 B2
(45) Date of Patent: Jan. 31, 2012

(54) MUSIC ACCOMPANIMENT APPARATUS HAVING DELAY CONTROL FUNCTION OF AUDIO OR VIDEO SIGNAL AND METHOD FOR CONTROLLING THE SAME

(75) Inventor: Kyung Ho Lee, Seoul (KR)

(73) Assignees: Enter Tech Co., Ltd., Seoul (KR); Kyung Ho Lee, Seoul (KR)

(*) Notice: Subject to any disclaimer, the term of this patent is extended or adjusted under 35 U.S.C. 154(b) by 268 days.

(21) Appl. No.: 12/103,926

(22) Filed: Apr. 16, 2008

(65) Prior Publication Data

US 2009/0178543 A1 Jul. 16, 2009

(30) Foreign Application Priority Data

Jan. 15, 2008 (KR) .................. 10-2008-0004191

(51) Int. Cl.
*G10H 1/36* (2006.01)

(52) U.S. Cl. ........... 84/610; 84/622; 84/625; 84/626; 84/634; 84/650; 84/659; 84/660; 84/662; 84/666

(58) Field of Classification Search ............ None
See application file for complete search history.

(56) References Cited

U.S. PATENT DOCUMENTS

| | | | | |
|---|---|---|---|---|
| 6,563,038 B2* | 5/2003 | Kikuchi | ............ | 84/610 |
| 7,304,229 B2* | 12/2007 | Chang | ............ | 84/610 |
| 7,563,975 B2* | 7/2009 | Leahy et al. | ............ | 84/619 |
| 2005/0115383 A1* | 6/2005 | Chang | ............ | 84/616 |

* cited by examiner

*Primary Examiner* — Marlon Fletcher
(74) *Attorney, Agent, or Firm* — Ladas & Parry LLP

(57) ABSTRACT

There is provided a music accompaniment apparatus that is connected to at least one external device to reproduce an audio or video signal, the music accompaniment apparatus including: an audio input section for inputting an external audio signal; an audio signal processing section for processing an audio signal including an accompaniment signal internally provided and an external audio signal input through the audio input section, and externally outputting the processed audio signal; a video signal processing section for processing a video signal including a caption signal, and externally outputting the processed video signal; a time delay calculating section for calculating the difference between a transmission time of a check signal to the at least one external device and a reception time of the check signal from the at least one external device to compute a time delay representing a delay of the audio or video signal for the at least one external device; and a control section for controlling the whole operation of the music accompaniment apparatus including generation and transmission/reception of the check signal, and controlling the transmission time of the video or audio signal in correspondence to the time delay. The present invention guarantees an efficient use of a digital device having a time delay as connected to the music accompaniment apparatus.

14 Claims, 2 Drawing Sheets

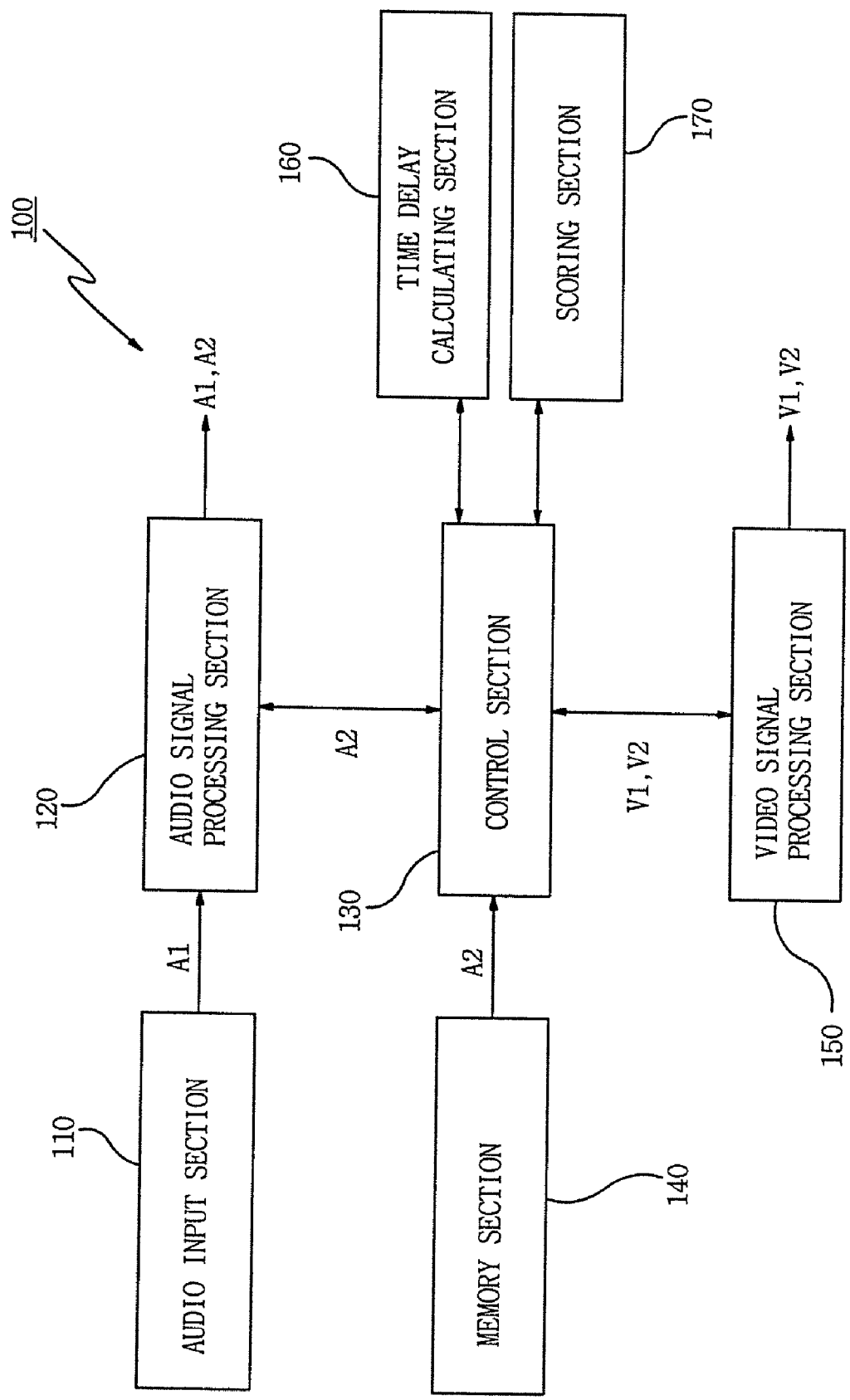

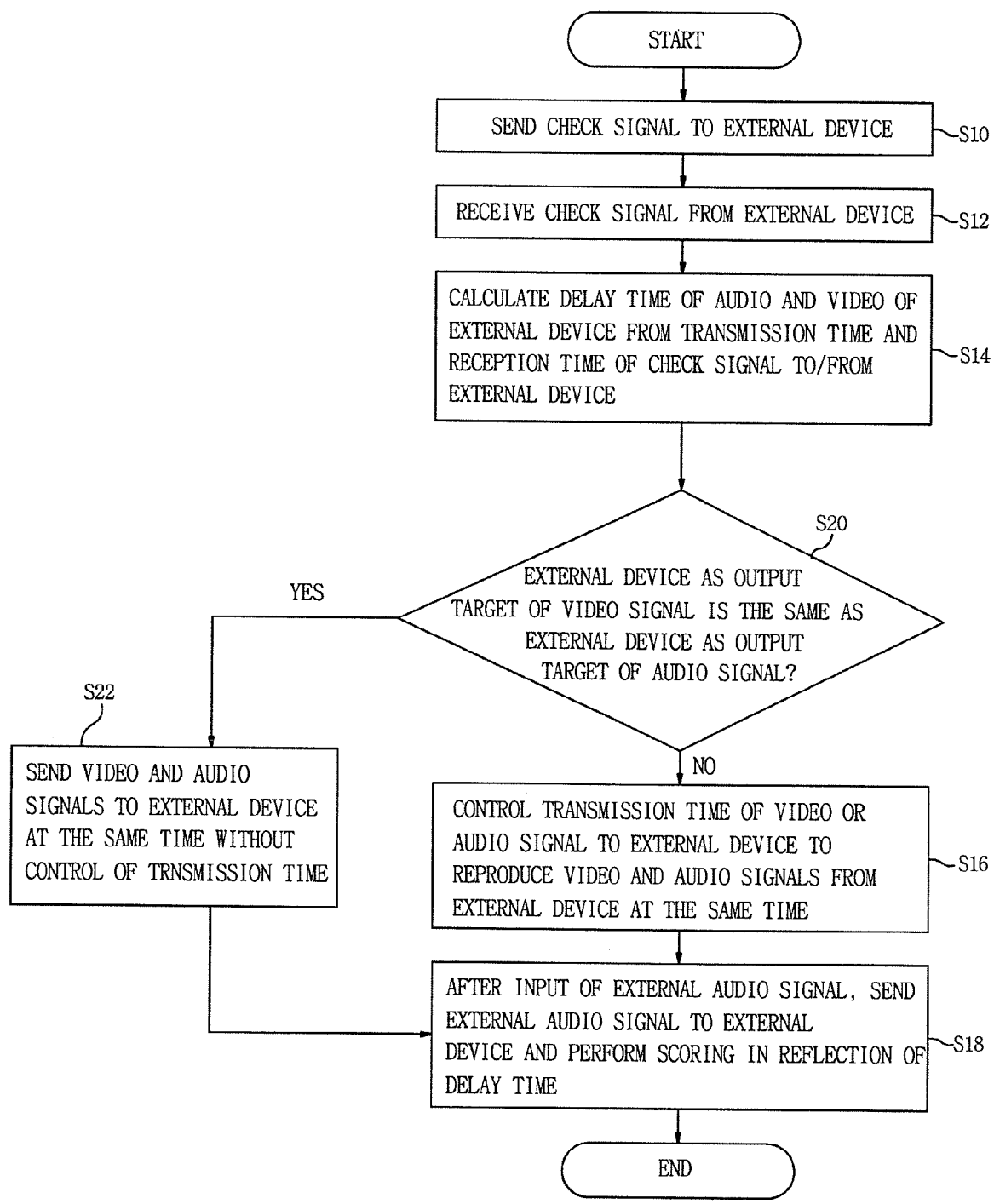

MUSIC ACCOMPANIMENT APPARATUS HAVING DELAY CONTROL FUNCTION OF AUDIO OR VIDEO SIGNAL AND METHOD FOR CONTROLLING THE SAME

CROSS-REFERENCE TO RELATED APPLICATION

This application claims the benefit of Korean Patent Application No. 10-2008-004191, filed on 15 Jan. 2008, the disclosure of which is hereby incorporated herein by reference in its entirety.

BACKGROUND OF THE INVENTION

1. Technical Field

The present invention relates to a music accompaniment apparatus and a method for controlling the same, and more particularly, to a music accompaniment apparatus and a method for controlling the same that is connected to external devices to reproduce audio or video signals and enabled to control a delay of the audio or video signals when connected to a digital device having a delay of the audio or video signals.

2. Discussion of Related Art

The music accompaniment apparatus is a device connected to external devices such as a video monitor or an audio amplifier to produce music accompaniment with a display of caption. Such a music accompaniment apparatus is common in home use and connectible to general household display devices such as TV, monitor, audio amplifier (speaker), or the like. Some variations in configuration are therefore required for the music accompaniment apparatus to cope with the rapid development trends of household display devices.

External devices connected to the music accompaniment apparatus are in continuous development in their configuration and system with the advance of industry. Among the external devices connected to the music accompaniment apparatus, for example, the television which has been developed from black and white television to color television is recently thrust into the high definition and multi-function world with the introduction of digital technologies in stereo sound, remote controller, caption broadcasting, data broadcasting, and so forth.

This trend results in a change of the existing audio or video reproducing devices from analog to digital system. There is hence a strong desire to use external digital devices in connection with the music accompaniment apparatus for audio or video reproduction. But the use of the external digital devices connected to the music accompaniment apparatus confronts some difficulties that may not be found in using the external analog devices.

Generally, the digital devices have more complicated circuitry than the analog devices and require analog-to-digital or digital-to-analog conversion to cause a signal delay. The presence of delay can be demonstrated simply by sending signals to both analog device and digital device at the same time and comparing the reproduction times of the signals.

For example, the digital television reproduces audio and video signals more slowly than the existing analog television. Some digital devices are designed to reproduce external input signals in the analog method, but the digital devices as used herein are confined to reproduce external input signal in the digital method.

In the music accompaniment apparatus, as a user sings along with an accompaniment signal (audio signal) and a caption signal (video signal) reproduced through the external devices connected to the music accompaniment apparatus, the external audio signal generated from the user's vocal performance is fed into a microphone and then reproduced through the external devices.

The music accompaniment apparatus in this case may use one external device for audio signal reproduction, with a different external device for music signal reproduction, or one external device (e.g., TV) for simultaneous reproduction of both audio and video signals.

The time delay of the digital device causes the most serious problem when connecting the music accompaniment apparatus to the external input port of digital device.

The problem caused when using an external analog device (e.g., audio amplifier) for reproduction of audio signal and an external digital device (e.g., TV) for reproduction of video signal is described as follows.

The audio signal or the video signal such as caption signal sent from the music accompaniment apparatus is reproduced from the digital device through an external input port of the digital device, in which case the digital device achieves the signal reproduction inevitably with a predetermined time delay. Contrary to the digital device, the analog device reproduces the audio or video signal without the time delay. It is expediently assumed that the time delay of analog devices is ignorable.

Accordingly, when the music accompaniment apparatus uses an external analog device (e.g., audio amplifier) for audio signal reproduction and an external digital device (e.g., TV) for video signal reproduction, there is the difference between the reproduction time of the audio signal from the external analog device and the reproduction time of the video signal from the external digital device, even though the audio signal and the video signal stored in the music accompaniment apparatus are simultaneously sent to the external analog device and the external digital device, respectively. This does not satisfy the inherent characteristic of the music accompaniment apparatus that the audio signal has the same reproduction time as the video signal.

In the other hand, the problem caused when using one external digital device (e.g., TV) for reproduction of both audio and video signals is described as follows.

The audio and video signals stored in the music accompaniment apparatus have the same reproduction time through the digital device. The digital device may have a circuit for making the same transmission time for the audio and video signals externally applied in a simultaneous time. Contrary to the case of reproducing audio and video signals separately, this case shows that the audio and video signals provided through an external input have the same reproduction time.

The user inputs an external audio signal through a microphone along with the reproduced audio and video signals. The external audio signal input through the microphone is reproduced through the digital device after an elapse of the time delay of the digital device. In this case, the reproduction time of the audio signal internally provided in the music accompaniment apparatus is different from the reproduction time of the external audio signal input through the microphone. The output time of the external audio signal has a significant time difference from the output time of the audio and video signals internally provided in the music accompaniment apparatus.

When an analog device is used for reproduction of both audio and video signals, in which case the time delay is ignored, the reproduction time of the audio and video signals internally provided in the music accompaniment apparatus is almost the same as the reproduction time of the external audio signal input through the microphone.

The scoring system of the music accompaniment apparatus has a problem, when the reproduction time of audio and video signals internally provided in the music accompaniment apparatus or the output time of the audio and video signals from the music accompaniment apparatus is different from the reproduction time of the external audio signal input through the microphone. The same problem occurs when using an external analog device (e.g., audio amplifier) for reproduction of audio signal and an external digital device (e.g., TV) for reproduction of video signal.

The audio signal or the video signal such as caption signal sent from the music accompaniment apparatus is reproduced from the digital device through an external input port of the digital device, in which case the digital device achieves the signal reproduction inevitably with a predetermined time delay. Contrary to the digital device, the analog device reproduces the audio or video signal without the time delay. It is expediently assumed that the time delay of analog device is ignorable.

Accordingly, when the music accompaniment apparatus uses an external analog device (e.g., audio amplifier) for audio signal reproduction and an external digital device (e.g., TV) for video signal reproduction, there is the difference between the reproduction time of the audio signal from the external analog device and the reproduction time of the video signal from the external digital device, even though the audio signal and the video signal stored in the music accompaniment apparatus are simultaneously sent to the external analog device and the external digital device, respectively. This does not satisfy the inherent characteristic of the music accompaniment apparatus that the audio signal has the same reproduction time as the video signal.

The scoring system of the music accompaniment apparatus performs scoring by similarity comparison of the audio signal (accompaniment signal) and the video signal (caption signal) internally provided in the music accompaniment apparatus and the external audio signal A1 input through the microphone in regard to frequency, beat, pitch and pitch contour.

Accordingly, when the reproduction time of the audio signal (accompaniment signal) and the video signal (caption signal) internally provided in the music accompaniment apparatus is different from the input time of the external audio signal A1 input through the microphone, the scoring system of the music accompaniment apparatus inevitably evaluates less similarity in frequency, pitch, pitch contour, or the like between the audio signal (accompaniment signal) and the video signal (caption signal) internally provided in the music accompaniment apparatus and the external audio signal A1 input through the microphone, resulting in a low score.

As described above, the music accompaniment apparatus when connected to at least one external digital device is required to improve various accompanied problems such as the reproduction time (output time) difference between audio and video signals, and erroneous scoring of the scoring system.

SUMMARY OF THE INVENTION

It is accordingly an object of the present invention to provide a music accompaniment apparatus having a delay control function of audio or video signals and a method for controlling the same.

It is another object of the present invention to provide a music accompaniment apparatus having a delay control function of audio or video signals and a method for controlling the same by which audio and video signals of external devices connected to the music accompaniment have the same reproduction time.

It is still another object of the present invention to provide a music accompaniment apparatus having a delay control function of audio or video signals and a method for controlling the same by which a singer's vocal performance is scored in reflection of the time delay of digital devices.

It is still another object of the present invention to provide a music accompaniment apparatus having a delay control function of audio or video signals and a method for controlling the same by which both digital and analog devices can be connected to the music accompaniment apparatus at the same time.

In one aspect of the present invention, there is provided a music accompaniment apparatus that is connected to at least one external device to reproduce an audio or video signal, the music accompaniment apparatus including: an audio input section for inputting an external audio signal; an audio signal processing section for processing an audio signal including an accompaniment signal internally provided and an external audio signal input through the audio input section, and externally outputting the processed audio signal; a video signal processing section for processing a video signal including a caption signal, and externally outputting the processed video signal; a time delay calculating section for calculating the difference between a transmission time of a check signal to the at least one external device and a reception time of the check signal from the at least one external device to compute a time delay representing a delay of the audio or video signal for the at least one external device; and a control section for controlling the whole operation of the music accompaniment apparatus including generation and transmission/reception of the check signal, and controlling the transmission time of the video or audio signal in correspondence to the time delay.

The control section controls the transmission time of a signal having a larger time delay out of the video and audio signals to be ahead of the transmission time of a signal having a smaller time delay by a predetermined time. The predetermined time corresponds to the time delay difference between the video and audio signals.

When the video signal is reproduced through a digital device among the at least one external device and the audio signal is reproduced through a separate analog device, the control section controls the transmission time of the video signal to be ahead of the transmission time of the audio signal by the time delay of the digital device.

The digital device includes digital TV, monitor, or other display devices, the analog device including analog TV, audio amplifier (speaker), headphone, or earphone.

The music accompaniment apparatus further includes a scoring section for performing scoring by comparison of the external audio signal input through the audio input section, the video signal including the caption signal, and the accompaniment signal. The scoring section performs the scoring in reflection of the time delay.

When both the video signal and the audio signal are reproduced through one external device, the control section controls the transmission time of the video signal the same as the transmission time of the audio signal.

The music accompaniment apparatus further includes a scoring section for performing scoring by similarity comparison of the external audio signal input through the audio input section, the video signal including the caption signal, and the accompaniment signal. The scoring section performs the scoring in reflection of the time delay.

The check signal is given in the form of a video or audio signal.

The music accompaniment apparatus further includes at least one of a memory section for storing the video signal or the accompaniment signal, an extension pack for addition of the video signal or the accompaniment signal, a memory card slot for insertion of a memory card, and a communication port (USB) for data communication with an external device. The music accompaniment apparatus is a microphone type music accompaniment apparatus having built-in circuitry related to audio and video reproduction in a microphone.

In another aspect of the present invention, there is provided a microphone type music accompaniment apparatus, which music accompaniment apparatus is connected to at least two external devices for separating and reproducing audio and video signals. When the at least two external devices include at least one analog device and at least one digital device, the music accompaniment apparatus differentiates a transmission time of the video signal from a transmission time of the audio signal to the at least two external devices.

When the at least one external device for reproducing the video signal is a digital device and the at least one external device for reproducing the audio signal is an analog device, the music accompaniment apparatus controls the transmission time of the video signal to be ahead of the transmission time of the audio signal. When the at least one external device for reproducing the video signal is an analog device and the at least one external device for reproducing the audio signal is a digital device, the music accompaniment apparatus controls the transmission time of the audio signal to be ahead of the transmission time of the video signal.

The transmission time difference between the video and audio signals is equal to a signal time delay of the digital device.

In still another aspect of the present invention, there is provided a method for controlling a music accompaniment apparatus that is connected to at least one external digital device to reproduce a video signal including a caption signal, the method including: calculating the difference between a transmission time of a check signal to the external digital device and a reception time of the check signal from the external digital device to define a time delay representing a delay of the video signal for the external digital device; and controlling the transmission time of the video signal in correspondence to the time delay.

When the video signal is reproduced through the external digital device and the audio signal is reproduced through a separate external audio amplifier as an analog device, the transmission time of the video signal is controlled to be ahead of the transmission time of the audio signal by the time delay.

The method further includes, after controlling the transmission time of the video or audio signal, with an audio input signal externally applied, sending the external audio signal to the external audio amplifier and performing scoring by similarity comparison of the external audio signal, the caption-including video signal, and an accompaniment signal. The scoring is performed in reflection of the time delay.

The external digital device includes digital TV, monitor or other display devices.

According to the present invention, the audio and video signals of a digital device connected to the music accompaniment apparatus have the same reproduction time even when the music accompaniment apparatus is connected to a digital device having a defined delay. In addition, the music accompaniment apparatus can score a singer's vocal performance in reflection of the time delay of the digital device and use both digital and analog devices at the same time.

The present invention will now be described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 1 is a block diagram of a music accompaniment apparatus according to an embodiment of the present invention; and FIG. 2 is an exemplary operational flow chart of the music accompaniment apparatus of FIG. 1.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention. Like numbers refer to like element.

The term "audio signal" as defined hereinafter refers to, in its broadest conception, signals reproduced through an audio amplifier or other audio reproducing devices and includes all kinds of audio signals such as accompaniment signals. The term "video signals" as defined hereinafter includes any kind of video signals reproduced through a video display device, such as caption signal, movie signal, still picture signal, and the like.

FIG. 1 is a block diagram of a music accompaniment apparatus 100 according to an embodiment of the present invention.

The music accompaniment apparatus includes a combination music accompaniment apparatus with speaker and a display device for reproduction of audio and video signals in "all-in-one" form. The music accompaniment apparatus of the present invention is confined to a music accompaniment apparatus connected to external devices such as audio or video reproducing devices (e.g., TV) for home or industrial use to perform audio and video reproduction (output).

The music accompaniment apparatus connected to external devices for audio and video reproduction is divided into a microphone type music accompaniment apparatus with all the music-accompaniment-related components built in a microphone, and a separated type music accompaniment apparatus with a main body containing the music-accompaniment-related components provided separately from a microphone for external audio input. The present invention includes both the microphone type music accompaniment apparatus and the separated type music accompaniment apparatus.

Referring to FIG. 1, the music accompaniment apparatus 100 according to an embodiment of the present invention includes an audio input section 110, an audio signal processing section 120, a video signal processing section 150, a time delay calculator 160, and a control section 130. The music accompaniment apparatus 100 further includes a memory section 140 and a scoring section 170.

The audio input section 110 converts an external audio input signal (i.e., a singer's audio signal) A1 to an electrical signal and sends the electrical audio signal. The audio input section 110 corresponds to a general microphone.

The audio signal processing section 120 processes an audio signal A2 applied from the internal part of the music accompaniment apparatus 100 such as the memory section 140 and the external audio signal A1 input through the audio input section 110, and externally outputs the processed audio signals. For this, the audio signal processing section 120 may include audio encode and decoder circuits.

The video signal processing section 150 processes video signals V1 and V2 and externally outputs the processed video signals.

The video signals V1 and V2 may be video signals stored in the memory section 140 or video signals externally applied. The video signals V1 and V2 may include a caption signal V1 or a movie signal V2. The video signals V1 and V2 may be television video signals (CVBS: Composite Video Banking Sync) or VGA signals.

The video signal processing section 150 further includes a video encoder, a video decoder, or any kind of controllers for processing video signals V1 and V2, such as graphic engine.

The time delay calculating section 160 calculates the difference between a transmission time of a check signal to the at least one external device and a reception time of the check signal from the at least one external device to define a time delay representing a delay of the audio signal A2 or the video signals V1 and V2 for the at least one external device.

The time delay is calculated as follows. First, the time delay calculating section 160 operates only when the external device connected to the music accompaniment apparatus 100 is a digital device. Under certain circumstances, it is needed to calculate the time delay when the external device is an analog device.

The music accompaniment apparatus 100 generates a check signal in either form of the video signal V1/V2 or the audio signal A2, when both the video signal V1/V2 and the audio signal A2 are reproduced from one digital device (e.g., digital TV) at the same time. In this case, the check signal in the form of the audio signal is generated from the audio signal processing section 120, or the check signal in the form of the video signal V1/V2 is generated from the video signal processing section 150. In another case, the check signal may be a signal already stored in the memory section 140. The control section 130 controls the generation of the check signal. Hereinafter, the check signal is assumed as a specific audio signal.

The time delay has the same value even when the check signal is a specific video signal. This is because the video signal V1/V2 and the audio signal A2 are set to have the same time delay in the most of digital devices. But, the time delay is necessarily calculated in a separate way for the video signal V1/V2 and the audio signal A2, in the case when the time delay is not set to have the same value for the video signal V1/V2 and the audio signal A2.

The specific audio signal is input to the digital device through an external input port and sent to an audio amplifier built in or externally mounted on the digital device through a reproduction circuit inside the digital device. The time delay calculating section 160 calculates the time delay by use of the difference between an input time of the specific audio signal to the digital device and a reproduction (output) time of the specific audio signal from the digital device.

The time delay is two seconds, for example, when the digital device reproduces an audio signal in correspondence to a check signal two seconds after receiving the check signal. Here, the output time of the specific audio signal from the digital device can be determined by inputting the specific audio signal generated from the audio amplifier through the audio input section 110 of the music accompaniment apparatus 100.

The time delay is given as follows when the video signal V1/V2 is reproduced through an external digital device and the audio signal A2 is reproduced through an external analog device.

In this case, the time delay for the audio signal A2 is ignored, and only the time delay for the video signal V1/V2 is calculated. For this, the music accompaniment apparatus 100 generates a check signal in the form of a video signal, that is, a specific video signal.

The specific video signal is input to the digital device through an external input port and reproduced through a display device (e.g., TV display, monitor, or the like) built in the digital device through a reproduction circuit in the digital device. The time delay calculator 160 calculates the time delay by use of the difference between an input time of the specific video signal to the digital device and a reproduction (output) time of the specific video signal from the digital device. The time delay is two seconds, for example, when the digital device reproduces a video signal in correspondence to a check signal two seconds after receiving the check signal.

Here, the output time of the specific video signal from the digital device can be determined by connecting the music accompaniment apparatus 100 to the video output port of the digital device.

The time delay is given as follows when the audio signal A2 is reproduced through a digital device and the video signal V1/V2 is reproduced through an analog device.

In this case, the time delay for the video signal V1/V2 is ignored, and only the time delay for the audio signal A2 is calculated. For this, the music accompaniment apparatus 100 generates a check signal in the form of an audio signal, that is, a specific audio signal.

The specific audio signal is input to the digital device through an external input port and reproduced through an audio amplifier built in or externally mounted on the digital device through a reproduction circuit in the digital device. The time delay calculator 160 calculates the time delay by use of the difference between an input time of the specific audio signal to the digital device and a reproduction (output) time of the specific audio signal from the digital device.

The time delay is two seconds, for example, when the digital device reproduces an audio signal in correspondence to a check signal two seconds after receiving the check signal. Here, the output time of the specific audio signal from the digital device can be determined by inputting the specific audio signal output from the audio amplifier through the audio input section 110 of the music accompaniment apparatus 100.

The time delay is calculated as follows in the case where the video signal V1/V2 is reproduced through a digital device and the audio signal A2 is reproduced through a different digital device that is different from the digital device for reproduction of the video signal V1/V2.

In this case, the time delay of the video signal V1/V2 is calculated in a separate way from the time delay of the audio signal A2. The methods for calculating the time delay of the video signal V1/V2 and the time delay of the audio signal A2 are the same as described in reference to the aforementioned three cases.

The digital device includes digital TV, monitor, or other display devices, and the analog device includes analog TV, audio amplifier (speaker), headphone, or earphone.

The control section 130 controls the whole operation of the music accompaniment apparatus 100 including generation and transmission/reception of the check signal, and adjusts the transmission time of the video signal V1/V2 or the audio signal A2 in correspondence to the time delay.

The transmission time of the video signal V1/V2 or the audio signal A2 depends on the time delay of the video signal V1/V2 and the time delay of the audio signal A2.

In principle, the control section 130 controls the transmission time of the video signal V1/V2 or the audio signal A2 so that the transmission time of a signal having a larger time delay out of the video signal V1/V2 and the audio signal A2 is ahead of the transmission time of a signal having a smaller time delay by a predetermined time.

When the music accompaniment apparatus 100 is connected to an analog device, the above-mentioned transmission time control is unnecessary because the time delay is ignored for the analog device. The transmission time control is not required also in the case of using one digital device for reproduction of the video signal V1/V2 and the audio signal A2 of the music accompaniment apparatus.

Except for the two cases, it is required to control the transmission time for the video signal V1/V2 and the audio signal A2 when the music accompaniment apparatus is connected to at least one digital device for reproducing the video signal V1/V2 and the audio signal A2 for the music accompaniment apparatus.

When the video signal V1/V2 is reproduced through a digital device and the audio signal A2 is reproduced through an analog device, the video signal V1/V2 is sent to the digital device ahead of the audio signal A2 by the time delay of the video signal V1/V2. This makes the output time of the video signal V1/V2 the same as the output time of the audio signal A2.

When the video signal V1/V2 is reproduced through an analog device and the audio signal A2 is reproduced through a digital device, the audio signal A2 is sent to the digital device ahead of the video signal V1/V2 by the time delay of the audio signal A2.

When the video signal V1/V2 is reproduced through one external digital device and the audio signal A2 is reproduced through another external digital device, the transmission time control for the video signal V1/V2 and the audio signal A2 is performed so that the transmission time of the signal having a larger time delay out of the video signal V1/V2 and the audio signal A2 is ahead of the transmission time of the signal having a smaller time delay by a predetermined time. This makes the audio signal A2 and the video signal V1/V2 reproduced at the same time. Here, the time delay of the audio signal A2 may be the same as or different from that of the video signal V1/V2. The audio signal A2 and the video signal V1/V2 have the same transmission time when the time delay of the audio signal A2 is equal to that of the video signal V1/V2.

The memory section 140 is for data backup and storage of all sorts of software for the operation of the control section 130, contents including audio signal files, music files, caption signal files and movie files, operation systems and so forth.

The memory section 140 may include a main memory having at least one RAM, a storage memory having at least one ROM including a flash memory, and a backup memory for data backup.

The music accompaniment apparatus 100 may further include at least one of a memory for storing the video signal V1/V2 and the accompaniment signal, an extension pack for addition of the video signal V1/V2 and the accompaniment signal, a memory card slot for insertion of memory cards, and a communication port (USB) for data communication with external peripheries.

The memory card slot (not shown) may have an external memory card interface for information reception from external memory cards, or an external extension pack interface including a plurality of extension slots for addition of external extension packs. The external memory card includes an SD memory card or an MMC memory card.

The scoring section 170 is for scoring a singer's vocal performance using the music accompaniment apparatus by similarity comparison between the singer's performance and the original song in regard to beat and pitch.

The scoring system of the music accompaniment apparatus performs scoring by similarity comparison of the audio signal (accompaniment signal) and the video signal (caption signal) internally provided in the music accompaniment apparatus and the external audio signal A1 input through the microphone in regard to frequency, beat, pitch and pitch contour.

It is accordingly assumed that the reproduction time of the audio signal (accompaniment signal) and the video signal (caption signal) internally provided in the music accompaniment apparatus, or the output time of the audio signal A2 or the video signal V1/V2 from the music accompaniment apparatus is different from the input time of the external audio signal A1 input through the microphone. In this case, the scoring system of the music accompaniment apparatus inevitably evaluates less similarity between the audio signal (accompaniment signal) and the video signal V1/V2 (caption signal) internally provided in the music accompaniment apparatus and the external audio signal A1 input through the microphone, resulting in a low score. That is, correct evaluation is impossible without reflecting the time delay. Accordingly, the scoring section 170 is required to perform scoring in reflection of the time delay.

The scoring when the external device connected to the music accompaniment apparatus 100 is an analog device is performed in the same manner as described above, that is, without reflecting the time delay. However, reflecting the time delay is necessary when the external device connected to the music accompaniment apparatus 100 includes at least one digital device.

The scoring operation of the scoring section 170 in reflection of the time delay is described as follows.

When the external device includes one digital device for reproduction of the video signal V1/V2 and the audio signal A2 of the music accompaniment apparatus, there is the difference between the output time of the video signal V1/V2 and the audio signal A2 from the music accompaniment apparatus and the reproduction time of the video signal V1/V2 and the audio signal A2 from the digital device. Here, a singer using the music accompaniment apparatus inputs the external audio signal A1 through the audio input section 110 at the reproduction time of the video signal V1/V2 and the audio signal A2 from the digital device.

The scoring section 170 performs scoring in reflection of the time delay in this case. It is assumed that the scoring is performed using the input time of the external audio signal A1 (i.e., the reproduction time of the video signal V1/V2 and the audio signal A2 from the digital device) as a reference. Then the scoring section 170 compares in similarity the external audio signal A1 with the video signal V1/V2 and the audio signal A2 output from the music accompaniment apparatus ahead of the input time of the external audio signal A1 by a predetermined time corresponding to the time delay.

It is assumed that the scoring is performed using the output time of the video signal V1/V2 and the audio signal A2 from the music accompaniment apparatus as a reference. In this case, the scoring section 170 compares the video signal V1/V2 and the audio signal A2 with the external audio signal A1 input at the reproduction time of the video signal V1/V2 and the audio signal A2 (i.e., after a predetermined time period corresponding to the time delay from the output time of the video signal V1/V2 and the audio signal A2 from the music accompaniment apparatus).

In other words, the scoring is performed by comparing the external audio signal A1 input through the audio input section 110 with the video signal V1/V2 and the audio signal A2 output from the music accompaniment apparatus ahead of the external audio signal A1 by the time delay.

It is now assumed that the music accompaniment apparatus uses a digital device for reproducing the video signal V1/V2 and an analog device for reproducing the audio signal A2.

Here, time delay occurs only for the video signal V1/V2, in which case the time delay for the audio signal A2 is ignored. The scoring section 170 compares the external audio signal A1 input through the audio input section 110 with the audio signal A2 at the same time, and evaluates the video signal V1/V2 output from the music accompaniment apparatus ahead of the reproduction time of the video signal V1/V2 by the time delay.

It is now assumed that the music accompaniment apparatus uses an analog device for reproducing the video signal V1/V2 and a digital device for reproducing the audio signal A2.

Here, time delay occurs only for the external audio signal A1 and the audio signal A2, in which case the time delay for the video signal V1/V2 is ignored.

The scoring section 170 in this case compares the external audio signal A1 input through the audio input section 110 with the video signal V1/V2 at the same time, and evaluates the audio signal A2 output from the music accompaniment apparatus ahead of the reproduction time of the audio signal A2 by the time delay.

It is assumed that the music accompaniment apparatus uses a digital device for reproducing the video signal V1/V2 and a different digital device for reproducing the audio signal A2.

The scoring section 170 in this case compares the external audio signal A1 input through the audio input section 110 with the audio signal A2 output from the music accompaniment apparatus ahead of the input time of the external audio signal A1 by a predetermined time period corresponding to the time delay of the audio signal A1, and the video signal V1/V2 output from the music accompaniment apparatus ahead of the external audio signal A1 by a predetermined time period corresponding to the time delay of the video signal V1/V2.

FIG. 2 is an exemplary operational flow chart of the music accompaniment apparatus of FIG. 1, showing the case of reproducing the audio and video signals from the same digital device and the case of reproducing the audio and video signals independently from different external devices connected to one digital device.

Referring to FIG. 2, a check signal is sent to the at least one external device connected to the music accompaniment apparatus 100 for calculation of the time delay of the video signal or the audio signal for the at least one external device (in S10). With an analog device used as the external device, in which case the time delay is ignorable, the step of calculating the time delay is not necessary.

In response to the check signal, the check signal output (reproduced) from the at least one external device is received (in S12).

The time delay of the video signal V1/V2 or the audio signal A2 is calculated from the transmission time of the check signal to the external device and the reception time of the check signal from the external device (in S14). As described above with reference to the operations of the control section 130 and the scoring section 170, the time delay may be calculated separately for both the audio signal A2 and the video signal V1/V2, or for either the audio signal A2 or the video signal V1/V2.

It is then determined whether the external device for output of the audio signal A2 is the same as the external device for output of the video signal V1/V2 (in S20). Namely, this is for determining whether the audio signal A2 and the video signal V1/V2 are reproduced through one external device or different external devices.

When one external digital device is used as the external device for reproducing the audio signal A2 and the video signal V1/V2 (YES), the video signal V1/V2 and the audio signal A2 are sent to the external digital device without being controlled in their transmission time (in S22). With the external audio signal A1 input through the microphone, the scoring is performed in reflection of the time delay of the video signal V1/V2 or the audio signal A2 (in S18).

When one external device is used for reproducing the video signal V1/V2 and another external device is used for reproducing the audio signal A2, the input times of the audio signal A2 and the video signal V1/V2 are controlled in reflection of the time delay so that the audio signal A2 and the video signal V1/V2 are reproduced independently from different external devices at the same time (in S16). With the external audio signal A1 input through the microphone, the scoring is performed in reflection of the time delay of the video signal V1/V2 or the audio signal A2 (in S18).

As described above, the present invention efficiently deals with the delay of at least one digital device used for reproducing an audio or video signal of the music accompaniment apparatus.

In other words, the audio and video signals of the digital device connected to the music accompaniment can have the same reproduction time even when the digital device has a defined delay. In addition, the present invention can score a singer's vocal performance using the music accompaniment apparatus in reflection of the time delay of digital devices connected to the music accompaniment apparatus, and employ both digital and analog devices connected to the music accompaniment apparatus.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A music accompaniment apparatus, which is connected to at least one external device to reproduce an audio or video signal, the music accompaniment apparatus comprising:

an audio input section for inputting an external audio signal;

an audio signal processing section for processing an audio signal including an accompaniment signal internally provided and an external audio signal input through the audio input section, and externally outputting the processed audio signal;

a video signal processing section for processing a video signal including a caption signal, and externally outputting the processed video signal;

a time delay calculating section for calculating the difference between a transmission time of a check signal to the at least one external device and a reception time of the check signal from the at least one external device to compute a time delay representing a delay of the audio or video signal for the at least one external device; and a control section for controlling the whole operation of the music accompaniment apparatus including generation and transmission/reception of the check signal, and controlling the transmission time of the video or audio signal in correspondence to the time delay.

2. The music accompaniment apparatus as claimed in claim 1, wherein the control section controls the transmission time of a signal having a larger time delay out of the video and audio signals to be ahead of the transmission time of a signal having a smaller time delay by a predetermined time, the predetermined time corresponding to the time delay difference between the video and audio signals.

3. The music accompaniment apparatus as claimed in claim 2, wherein when the video signal is reproduced through a digital device among the at least one external device and the audio signal is reproduced through a separate analog device, the control section controls the transmission time of the video signal to be ahead of the transmission time of the audio signal by the time delay of the digital device.

4. The music accompaniment apparatus as claimed in claim 3, wherein the digital device includes digital TV, monitor, or other display devices, the analog device including analog TV, audio amplifier (speaker), headphone, or earphone.

5. The music accompaniment apparatus as claimed in claim 4, further comprising:

a scoring section for performing scoring by comparison of the external audio signal input through the audio input section, the video signal including the caption signal, and the accompaniment signal, the scoring section performing the scoring in reflection of the time delay.

6. The music accompaniment apparatus as claimed in claim 2, wherein when both the video signal and the audio signal are reproduced through one external device, the control section controls the transmission time of the video signal the same as the transmission time of the audio signal.

7. The music accompaniment apparatus as claimed in claim 6, further comprising:

a scoring section for performing scoring by similarity comparison of the external audio signal input through the audio input section, the video signal including the caption signal, and the accompaniment signal, the scoring section performing the scoring in reflection of the time delay.

8. The music accompaniment apparatus as claimed in claim 1, wherein the check signal is given in the form of a video or audio signal.

9. The music accompaniment apparatus as claimed in claim 1, further comprising:

at least one of a memory section for storing the video signal or the accompaniment signal, an extension pack for addition of the video signal or the accompaniment signal, a memory card slot for insertion of a memory card, and a communication port (USB) for data communication with an external device.

10. The music accompaniment apparatus as claimed in claim 1, wherein the music accompaniment apparatus is a microphone type music accompaniment apparatus having built-in circuitry related to audio and video reproduction in a microphone.

11. A method for controlling a music accompaniment apparatus, which music accompaniment apparatus is connected to at least one external digital device to reproduce a video signal including a caption signal, the method comprising:

processing a video signal including a caption signal, and externally outputting the processed video signal;

sending a check signal to the external device and receiving the check signal from the external device;

calculating in the music accompaniment apparatus the difference between a transmission time of the check signal sent to the external digital device and a reception time of the check signal received from the external digital device to define a time delay representing a delay of the video signal for the external digital device; and controlling the transmission time of the video signal in correspondence to the time delay.

12. The method as claimed in claim 11, wherein the music accompaniment apparatus processes an audio signal and externally outputs the audio signal, and when the video signal is reproduced through the external digital device and the audio signal is reproduced through a separate external audio amplifier as an analog device, the transmission time of the video signal is controlled to be ahead of the transmission time of the audio signal by the time delay.

13. The method as claimed in claim 12, further comprising:

after the step of controlling the transmission time of the video or audio signal, when there is an audio input signal externally applied, sending the external audio signal to the external audio amplifier and performing scoring by similarity comparison of the external audio signal, the caption-including video signal, and an accompaniment signal, the scoring being performed in reflection of the time delay.

14. The method as claimed in claim 13, wherein the external digital device includes digital TV, monitor or other display devices.

* * * * *